(No Model.)
H. F. DILLENBACH.
SHEARS.
No. 563,458. Patented July 7, 1896.
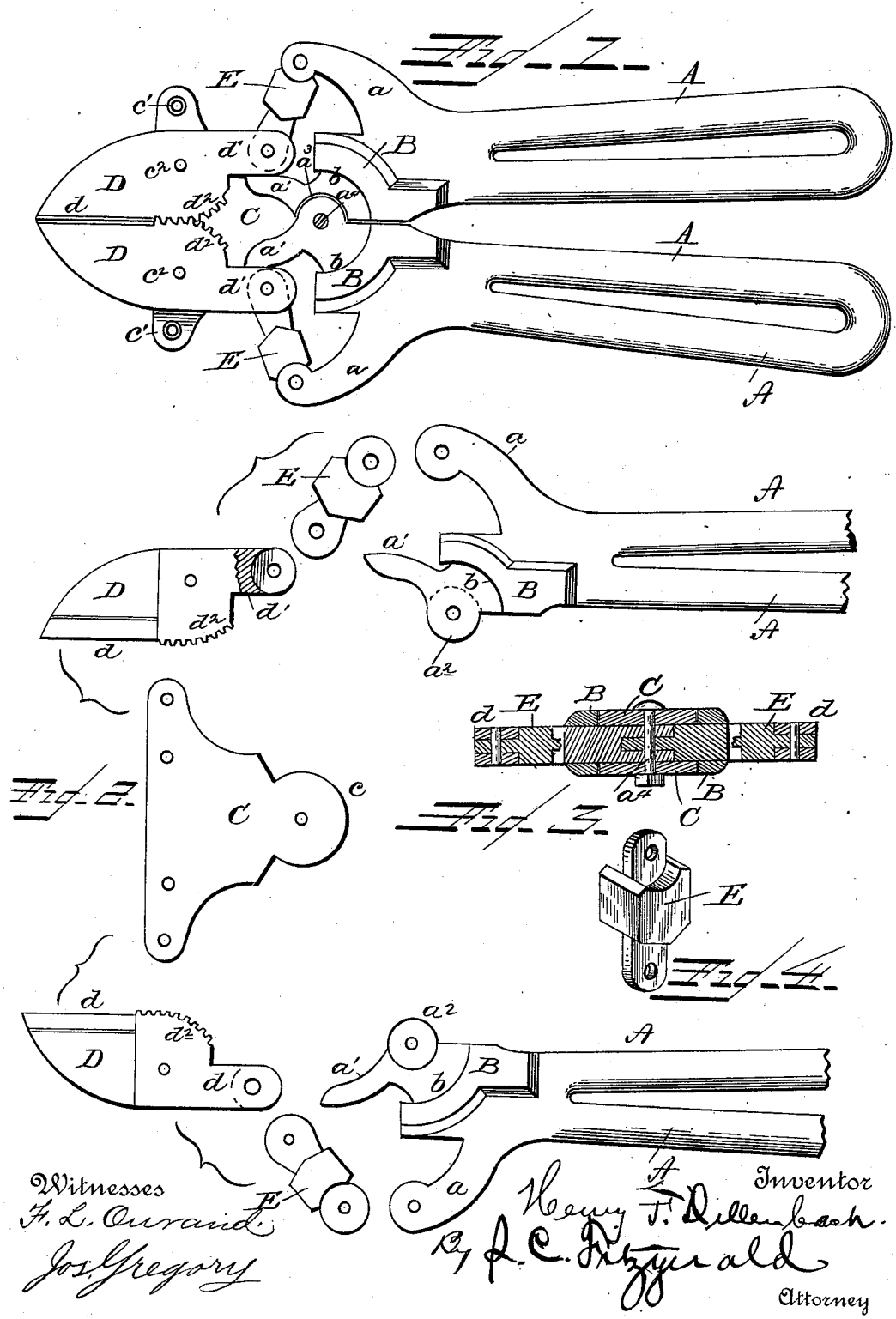
Witnesses
F. L. Ourand
Jos. Gregory
Inventor
Henry F. Dillenbach
By J. C. Fitzgerald
Attorney

UNITED STATES PATENT OFFICE.

HENRY F. DILLENBACH, OF PULASKI, NEW YORK.

SHEARS.

SPECIFICATION forming part of Letters Patent No. 563,458, dated July 7, 1896.

Application filed June 12, 1895. Renewed April 16, 1896. Serial No. 587,873. (No model.)

*To all whom it may concern:*

Be it known that I, HENRY F. DILLENBACH, a citizen of the United States, residing at Pulaski, in the county of Oswego, State of New York, have invented certain new and useful Improvements in Shears; and I do hereby declare the following to be a full, clear, and exact description of the invention, such as will enable others skilled in the art to which it appertains to make and use the same.

My invention relates to improvements in shears or cutters, and particularly to that class of shears or cutters operated through the medium of compressed levers, and intended for cutting metal or the like.

The invention will first be described in connection with the accompanying drawings, and then particularly pointed out in the claims.

In the drawings, Figure 1 is a view showing one side of the shears with one of the head-plates removed. Fig. 2 is a plan view of the parts before being assembled. Fig. 3 shows a transverse section on line $xx$, Fig. 1, and Fig. 4 a perspective view of link E.

Referring to the drawings, A are hand-levers, each provided with an outward-extending arm $a$ and with a curved forward-projecting arm $a'$, the said hand-levers being each provided with an inward-extending boss or ear $a^2$, one of which is provided with a recess $a^3$, Fig. 1, into which the opposite boss or ear enters, being preferably semicircular, as shown in Fig. 3, and both ears being perforated to receive a pintle-bolt $a^4$. On each side of each hand-lever is secured a segment B, having its inner curved edge $b$ adapted to come into contact with the corresponding edge $c$ of a head-plate C, the pair of head-plates being secured together by the pivot-bolt $a^4$ and by two pairs of bolts $c'$ $c^2$. Between the forward ends of the said head-plates are pivoted upon the bolts $c^2$ the blades D, having cutting edges $d$, and provided with rearward-extending arms $d'$, arranged to extend beyond and rest in frictional contact with the outer surface of the curved forward-projecting arms $a'$. The arms D are also provided with cogged segments $d^2$, meshing together and serving to produce a simultaneous movement of the blades. The rear ends of the rearward-extending arms $d'$ and forward ends of the outward-extending arms $a$ are slotted and are connected, as shown, by links E, pivoted in the slots and provided each with an enlargement, which is concave on one end to fit the rounded ends of the arms $a$.

The operation of my device may be briefly described as follows: The blades are opened by drawing the handles apart, the former swinging on the bolts $c^2$, the latter upon the bolt $a^4$, the links E transmitting motion from the arms $a$ of the hand-levers to the respective blades. When the handles are pressed together, the links E tend to draw the blades together, and in addition the forward-projecting arms $a'$, bearing against the inner rear ends of the blades, also force the said rear ends outward and thus close the blades, so that in cutting heavy iron or the like the strain is removed from the links and their pivot-bolts.

Having thus fully described my invention, what I claim as new, and desire to secure by Letters Patent, is—

1. A cutting implement consisting of two handle-sections A, pivotally connected together near one end, and each provided with a forwardly-projecting finger $a'$, and an outwardly-projecting finger $a$, two pivoted cutting-blades having their rear ends reduced to form arms $d'$, which contact with the outer faces of the arms or fingers $a'$ on the handle-sections, and links E, pivotally connected to the fingers $a$ of the handle-sections and extending inwardly and pivoted to said arms $d'$ of the cutting-blades, substantially as set forth.

2. A cutting implement consisting of two handle-sections A, pivotally connected together near one end, and having on each face a boss B extending concentric with and partially around said pivot-point, head-plates C each provided with a portion $c$ adapted to fit within the seat formed in the handle-sections by the said boss B, and be connected to said handle-sections by the pivot which unites them, cutting-blades D arranged between and pivotally connected to said head-plates, and links connecting the inner ends of said blades with the handle-sections A, substantially as set forth.

3. A cutting implement consisting of two handle-sections A, each provided with a forwardly-projecting finger $a'$, terminating at its inner end in an enlarged ear $a^2$, and with a boss B extending partially around said ear $a^2$, one of said ears $a^2$ being adapted to fit within a recess or socket $a^3$ formed in the other of said ears, head-plates C, each having a portion $c$ conforming in shape to and adapted to bear against the ears $a^2$ with its rear edge bearing against the adjacent boss B, a pivot-bolt $a^4$ extending through the ears $a^2$ and portions $c$ of the head-plates, cutting-blades D arranged between and pivoted to the head-plates, and each having a rearwardly-extending reduced portion $d'$ which contact with the outward faces of the arms $a'$ of the handle-sections, and links connecting the free ends of the arms $d'$ with the handle-sections, substantially as set forth.

In testimony whereof I affix my signature in presence of two witnesses.

HENRY F. DILLENBACH.

Witnesses:
SENECA D. MOORE,
LEONARD KNOWLTON.